United States Patent [19]

Waters

[11] 3,856,220

[45] Dec. 24, 1974

[54] BLADES FOR FOOD PREPARING MACHINE

[75] Inventor: Barrett Bradford Waters, Sheridan, Wyo.

[73] Assignee: The Hobart Manufacturing Company, Troy, Ohio

[22] Filed: Mar. 26, 1973

[21] Appl. No.: 345,207

[52] U.S. Cl. ............................................ 241/282.1
[51] Int. Cl. ............................................. B02c 18/12
[58] Field of Search............ 241/199.12, 277, 282.1, 241/282.2; 289/107, 108, DIG. 25, DIG. 26

[56] References Cited
UNITED STATES PATENTS

| 2,284,155 | 5/1942 | Landgraf | 241/282.1 UX |
| 3,024,010 | 3/1962 | Sperling | 259/107 |
| 3,156,278 | 11/1964 | Otto | 241/282.2 |
| 3,434,518 | 3/1969 | Motis | 241/199.12 |
| 3,528,469 | 9/1970 | Mantelet | 241/199.12 |
| 3,596,692 | 8/1971 | Swanke | 241/199.12 |

Primary Examiner—Roy Lake
Assistant Examiner—Howard N. Goldberg
Attorney, Agent, or Firm—Biebel, French & Bugg

[57] ABSTRACT

The blade structure of a food preparing machine includes an upper blade with a leading edge surface beveled on its lower face and a lower blade having an upwardly facing beveled leading edge. The lower blade is adjacent the bottom wall of the food container portion of the apparatus. A short third knife blade has a portion projecting upwardly at an inclined angle. All three blades are mounted on a common vertical shaft for mixing and comminuting material within the container.

6 Claims, 4 Drawing Figures

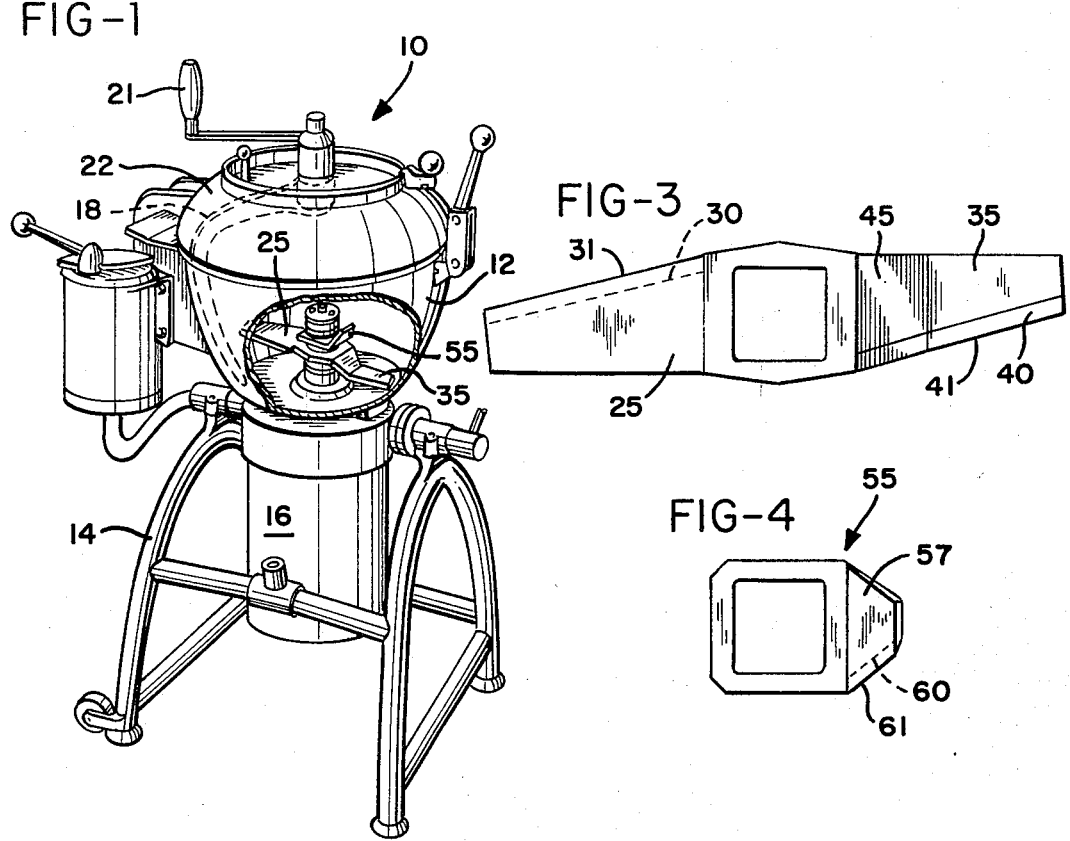
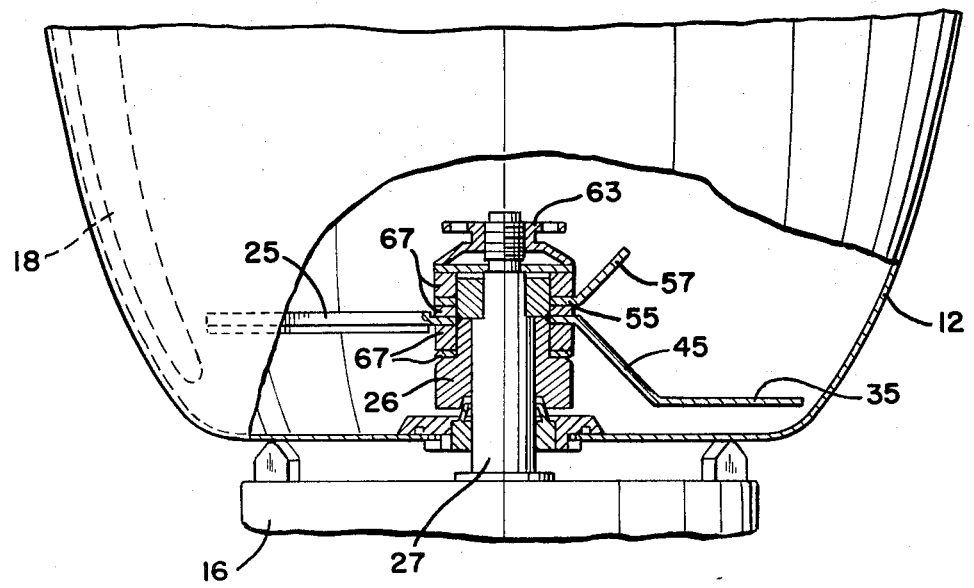

BLADES FOR FOOD PREPARING MACHINE

BACKGROUND OF THE INVENTION

This invention relates to food preparing machines, and more particularly to a new blade structure for a mixer-cutter apparatus.

In commercial kitchens a machine typically used for simultaneous cutting, comminuting, and mixing of food materials within a bowl or container, is commonly referred to as a cutter-mixer. Such a machine has a large bowl or container (i.e., from 10 to 130 quarts capacity) in which a knife structure is rotated at high speed for cutting, comminuting, and mixing the food therein. A variety of knife structures is available, according to the particular task to be performed.

Such cutter-mixers have proven highly advantageous in the food preparation industry. Their high capacity, high efficiency, and high speed of operation have proven particularly valuable in certain demanding applications, and new blade structures are therefore always desirable to extend the range of food materials these machines can handle, and to provide a wider range of preparation characteristics. However, new blade configurations must be suited to the high speed and high power of these machines.

SUMMARY OF THE INVENTION

Briefly, a preferred embodiment of this invention provides a blade structure which requires less power but functions for longer periods of time to achieve results as good, and equally as uniform, as that of prior art blade structures.

The blade structure of the present invention includes an upper blade and a lower blade which are preferably connected together by an integral portion which slopes downwardly from the upper blade to the lower blade. The blades are mounted on a drive shaft for rotation thereby within the bowl. The lower blade is positioned substantially adjacent the bottom wall of the bowl and is generally diametrically opposite the upper blade, relative to the shaft.

A portion of the leading edge surface of the upper blade is beveled and faces generally the bottom wall of the container. A portion of the leading edge surface of the lower blade is also beveled and faces away from the bottom wall. The upper blade also includes a slight twist along the principal axis thereof, the twist raising the leading edge and lowering the trailing edge of the blade. The beveled leading edge surfaces and the upper blade twist cooperates to effect optimum mixing and comminuting of the food material within the bowl.

A short third knife blade is mounted on the shaft above the upper blade. The third knife blade includes a beveled leading edge surface portion facing generally the bottom wall, but projecting upwarding at an inclined angle relative to the upper knife blade and the shaft. The short third blade provides an additional cutting surface to help break up larger pieces of food product before they reach the longer blades therebeneath. This preliminary cutting of larger pieces allows the larger upper and lower blades to deal with the food product more easily and effectively.

It is therefore an object of this invention to provide an improved blade structure for a food preparing machine; a blade structure which requires substantially less power than presently known blade structures; which will prepare the food products equally as well as, or better than, present blade structures; which will perform these functions somewhat more slowly, to allow a longer and more readily adjusted operating time for the food preparing machine; which has an upper knife blade and a lower knife blade which may be mounted on the drive shaft adjacent the bottom wall of the bowl of the food preparing apparatus with the upper knife blade having a beveled leading edge surface portion facing generally the bottom wall of the bowl; in which a third knife blade is mounted on the shaft, a portion of which projects upwardly at an inclined angle relative to the upper knife blade; and to accomplish all the above objects and purposes in an inexpensive, uncomplicated, highly durable, reliable, and serviceable configuration well suited to the efficient preparation of a wide variety of food products.

Other objects and advantages of the invention will be apparent from the following description, the accompanying drawings and the appended claims.

BRIEF DESCRIPTION OF THE DRAWINGS

FIG. 1 is a perspective view of a typical mixer-cutter apparatus with a portion broken away to show the blade structure of this invention incorporated therein;

FIG. 2 is a partially broken-away side view of the container portion of the FIG. 1 apparatus showing therein the blade structure and mounting means of this invention partially in section;

FIG. 3 is a top view of the upper and lower knife blades; and

FIG. 4 is a top view of the third knife blade.

DESCRIPTION OF THE PREFERRED EMBODIMENT

With reference to the drawings, and more particularly to FIG. 1, there is illustrated a mixer-cutter 10 incorporating the blade structure of this invention.

The mixer-cutter includes bowl 12, a base 14, a drive motor 16, a mixer baffle 18, and a baffle turning handle 21. In larger units a motor drive (not shown) may be used to turn the baffle. A lid 22 is removably mounted on top of the bowl or container 12, and the baffle and handle 21 are rotatably mounted upon a common shaft passing through lid 22. Handle 21 may thus be turned to cause the mixer baffle 18 to move about the periphery of the interior of bowl 12.

An upper knife blade 25 is mounted within bowl 12 upon a short shaft 26, which is mounted in turn on a drive shaft 27. Drive shaft 27 is rotatably mounted through the bottom wall of the container and connected to motor 16 for rotation thereby.

A portion 30 of the leading edge surface of upper knife blade 25 is beveled to a sharp leading edge 31, with the edge facing generally the bottom wall of container 12 to impel food articles downwardly as portion 30 rotates thereagainst.

A lower knife blade 35 is mounted on shaft 26 adjacent the bottom wall of bowl 12. Lower knife blade 35 includes a beveled leading edge surface 40 forming a sharp leading edge 41. Surface 40 faces away from the bottom wall of bowl 12 to cooperate with upper knife blade portion 30 to effect optimum mixing and comminuting of the material within the bowl. A sloping portion 45 of lower blade 35 integrally connects the lower blade to the upper blade, facilitating easy insertion and removal of the blades for cleaning and servicing.

A third knife blade 55 is mounted on shaft 26 above upper knife blade 25. An end portion 57 of blade 55 projects upwardly in a direction away from the bottom of bowl 12 and at an inclined angle relative to upper knife blade 25. The upwardly projecting portion 57 of the third knife blade 55 has a radial extent approximately one-forth that of the lower knife blade 35. A portion 60 of upwardly projecting portion 57 includes a downwardly facing leading edge surface portion, similar to surface portion 30 on blade 25, and forming a sharp leading edge 61. Blade 55 is mounted generally above lower blade 35.

A knob 63 engages the upper end of shaft 27 to hold shaft 26 and the blades thereon, with spacers 67 maintaining the proper spacing between the blades themselves.

A slight twist, preferably about 7°, is given to the upper knife blade along its principal axis, to turn the leading edge slightly up and the trailing edge slightly down. This twist, in combination with the leading edge portions 30, 40, and 60, promotes circulation and uniformity of the food products within the bowl 12.

The third knife blade 55 provides a short cutting edge 61 considerably above blades 25 and 35. Blade 55 is thus able to break up larger pieces of the food product before they move down to the vicinity of blades 25 and 35. This makes it possible for the larger blades 25 and 35 to deal more easily and effectively with the food product.

In operation, this blade arrangement has proven to have several distinct advantages. For example, in kneeding a batch of bread dough, the peak power consumption never exceeded 6,000 watts, whereas over 9,000 watts was required with prior art blade structures. Similarly, the time required for preparing the dough was 3 minutes as compared with 2 minutes for the older designs. While the total energy consumed remained about the same, the peak power consumption was reduced by 33 percent and the time required was increased by 50 percent, while the final product was essentially indistinguishable from that produced by prior art blade structures. The extension of the time duration of the operation is in fact advantageous, since it allows a closer control over variation of the machine time cycle without significantly affecting its ability to operate rapidly.

Similar results have been obtained in the preparation of other food products. For example, the preparation of mayonnaise is a delicate operation. The mayonnaise must develop in just the right way, or the product will be inferior. The blade structure of this invention has been highly successful in developing mayonnaise properly, while requiring substantially less peak power and increasing the time sufficiently to make the function of the cutter-mixer machine more manageable.

While the form of apparatus herein described constitutes a preferred embodiment of this invention, it is to be understood that the invention is not limited to this precise form of apparatus, and that changes may be made therein without departing from the scope of the invention.

What is claimed is:

1. In an apparatus for comminuting and mixing materials, including a container having a bottom wall surrounded by a side wall, a drive shaft rotatably passing through the bottom wall, and a motor drivably connected to the rotatable shaft for rotation thereof, this improvement comprising:

a. an upper knife blade and a lower knife blade mounted on the shaft adjacent the bottom wall of the container, said upper knife blade having a beveled leading edge surface portion facing generally the bottom wall, and said lower knife blade having a beveled leading edge surface portion facing away from the bottom wall to effect optimum mixing and comminuting of material within the container, and b. a third knife blade mounted on the shaft above said upper blade and having a portion projecting upwardly at an inclined angle relative to said upper knife blade, said upwardly projecting portion having a radial extent approximately one-fourth that of said lower knife blade and including a beveled leading edge surface portion.

2. The apparatus of claim 1 wherein said lower blade is positioned adjacent the bottom wall and extends generally parallel thereto.

3. The apparatus of claim 1 wherein said upper and lower knife blades are arranged generally diametrically opposite relative to the shaft.

4. The apparatus of claim 1 wherein said upper blade is integrally connected to said lower blade, and wherein said lower blade includes a portion sloping downwardly from said upper blade.

5. The apparatus of claim 1 wherein said upper knife blade includes a slight twist of about 7° along the major axis thereof to elevate the leading edge thereof slightly above the trailing edge thereof.

6. In an apparatus for comminuting and mixing materials, including a container having a bottom wall surrounded by a side wall, a drive shaft rotatably passing through the bottom wall, and a motor drivably connected to the roatable shaft for rotation thereof, the improvement comprising:

a. an upper knife blade mounted on the drive shaft and having a beveled leading edge surface portion facing generally the bottom wall, said upper knife blade having a slight twist of about 7° along the major axis thereof to elevate the leading edge thereof slightly above the trailing edge thereof, b. a lower knife blade positioned adjacent and extending generally parallel to the bottom wall and having a beveled leading edge surface portion, said lower knife blade being generally diametrically opposite said upper blade relative to the shaft and having a radial extent approximately equal to that of said upper knife blade, c. a blade portion integrally connecting said upper and lower blades and sloping downwardly from said upper blade to said lower blade, and d. a third knife blade mounted on the shaft above said upper blade, said third knife blade including a beveled leading edge surface portion and having a portion projecting upwardly at an inclined angle relative to said upper knife blade, said upwardly projecting portion having a radial extent approximately one-fourth that of said lower knife blade.

* * * * *